(12) United States Patent
Ishikura

(10) Patent No.: US 8,851,684 B2
(45) Date of Patent: Oct. 7, 2014

(54) OPTICAL UNIT INCLUDING AN INTEGRATOR OPTICAL SYSTEM, AND PROJECTION DISPLAY DEVICE INCLUDING THE OPTICAL UNIT

(75) Inventor: Naofumi Ishikura, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 418 days.

(21) Appl. No.: 13/375,762

(22) PCT Filed: Jun. 18, 2009

(86) PCT No.: PCT/JP2009/061089
§ 371 (c)(1),
(2), (4) Date: Dec. 1, 2011

(87) PCT Pub. No.: WO2010/146683
PCT Pub. Date: Dec. 23, 2010

(65) Prior Publication Data
US 2012/0075592 A1    Mar. 29, 2012

(51) Int. Cl.
*G03B 21/14* (2006.01)
*G03B 21/20* (2006.01)
*H04N 9/31* (2006.01)

(52) U.S. Cl.
CPC .............. *G03B 21/14* (2013.01); *G03B 21/202* (2013.01); *H04N 9/3164* (2013.01); *G03B 21/2026* (2013.01); *G03B 21/208* (2013.01); *G03B 21/20* (2013.01); *H04N 9/3114* (2013.01)
USPC .............................................. 353/84; 353/94

(58) Field of Classification Search
CPC ............. G03B 21/2013; G03B 21/208; G03B 21/202; G03B 21/2026; H04N 9/3114; H04N 9/3164
USPC ........................................ 353/84, 94; 348/743
See application file for complete search history.

(56) References Cited

U.S. PATENT DOCUMENTS 6,252,636 B1 * 6/2001 Bartlett .......................... 348/743
6,505,939 B1 * 1/2003 Bierhuizen et al. ............. 353/94
(Continued)

FOREIGN PATENT DOCUMENTS

JP   2001-13604 A    1/2001
JP   2005-115094 A   4/2005
(Continued)

OTHER PUBLICATIONS

International Search Report (ISR) (PCT Form PCT/ISA/210) dated Jul. 14, 2009, in PCT/JP2009/061089.

*Primary Examiner* — Francis M Legasse, Jr.
*Assistant Examiner* — Bao-Luan Le
(74) *Attorney, Agent, or Firm* — McGinn IP Law Group, PLLC

(57) ABSTRACT

Provided is an optical unit that includes: light source (1a); light source (1b) located to face light source (1a); color wheel (2) located between light sources (1a and 1b); prism unit (3a) that totally reflects light emitted from light source (1a) and that is transmitted through color wheel (2), and transmits light emitted from light source (1b) to enter color wheel (2); and prism unit (3b) that totally reflects the light emitted from light source (1b) and that is transmitted through color wheel (2), and transmits the light emitted from light source (1a) to enter color wheel (2).

6 Claims, 11 Drawing Sheets

(56) References Cited

U.S. PATENT DOCUMENTS

| | | | |
|---|---|---|---|
| 6,666,558 B1* | 12/2003 | Yamagishi et al. | 353/94 |
| 6,758,579 B2* | 7/2004 | Ishikawa et al. | 362/238 |
| 7,033,056 B2* | 4/2006 | Andersen et al. | 362/554 |
| 7,530,697 B2* | 5/2009 | Sawai et al. | 353/94 |
| 7,628,495 B2* | 12/2009 | Tangen | 353/94 |
| 7,832,876 B2* | 11/2010 | Yagyu | 353/94 |
| 7,871,168 B2* | 1/2011 | Liu et al. | 353/84 |
| 7,926,951 B2* | 4/2011 | Bietry et al. | 353/31 |
| 8,066,382 B2* | 11/2011 | Silverstein et al. | 353/20 |
| 8,235,536 B2* | 8/2012 | Andersen et al. | 353/94 |
| RE43,959 E* | 2/2013 | Andersen et al. | 362/554 |
| 8,408,709 B2* | 4/2013 | Sawai et al. | 353/20 |
| 8,573,779 B2* | 11/2013 | Yamagishi et al. | 353/33 |
| 8,622,551 B2* | 1/2014 | Andersen et al. | 353/94 |
| 2004/0165155 A1* | 8/2004 | Lee et al. | 353/81 |
| 2005/0013142 A1* | 1/2005 | Andersen et al. | 362/583 |
| 2005/0146891 A1* | 7/2005 | Hatakeyama | 362/551 |
| 2006/0044523 A1* | 3/2006 | Teijido et al. | 353/53 |
| 2006/0164726 A1* | 7/2006 | Morejon et al. | 359/495 |
| 2006/0244929 A1* | 11/2006 | Sawai et al. | 353/84 |
| 2006/0285084 A1* | 12/2006 | Lin | 353/84 |
| 2007/0121084 A1* | 5/2007 | Chang | 353/94 |
| 2007/0268464 A1 | 11/2007 | Lin | |
| 2009/0027631 A1* | 1/2009 | Liu et al. | 353/84 |
| 2009/0153752 A1* | 6/2009 | Silverstein | 348/750 |
| 2009/0213330 A1* | 8/2009 | Silverstein et al. | 353/8 |
| 2009/0284713 A1* | 11/2009 | Silverstein et al. | 353/8 |
| 2010/0328611 A1* | 12/2010 | Silverstein et al. | 353/7 |
| 2011/0007279 A1* | 1/2011 | Silverstein et al. | 353/8 |
| 2011/0141438 A1* | 6/2011 | Sawai et al. | 353/20 |

FOREIGN PATENT DOCUMENTS

| | | |
|---|---|---|
| JP | 2006-30330 A | 2/2006 |
| JP | 2007-140344 A | 6/2007 |
| JP | 2007-293033 A | 11/2007 |
| JP | 2007-310331 A | 11/2007 |

* cited by examiner

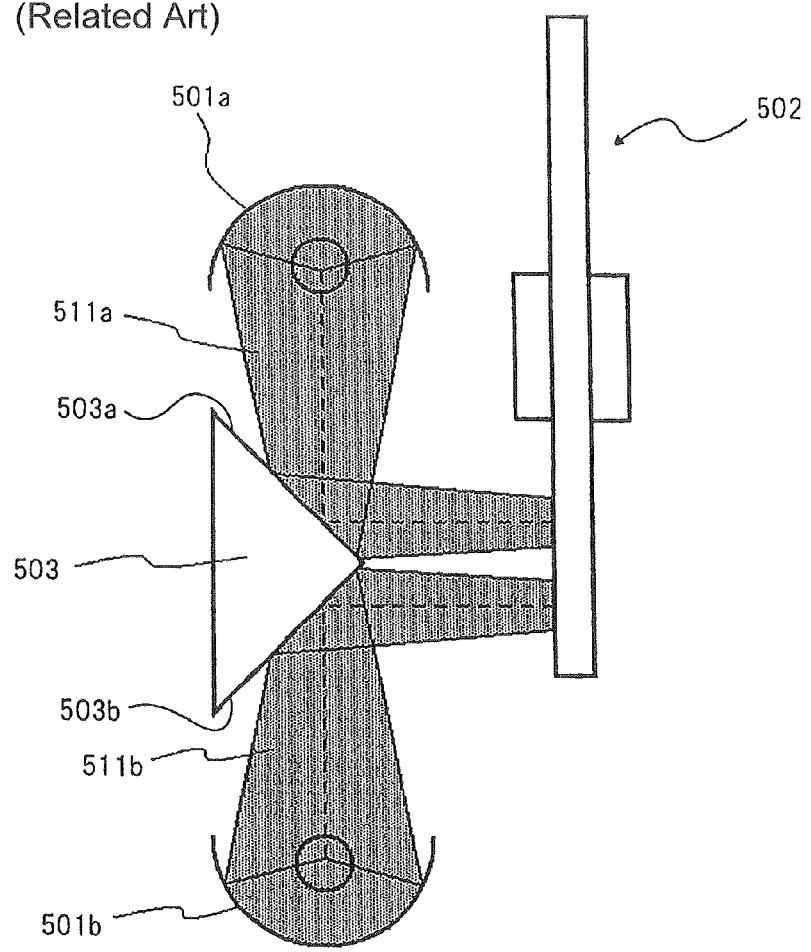

OPTICAL UNIT INCLUDING AN INTEGRATOR OPTICAL SYSTEM, AND PROJECTION DISPLAY DEVICE INCLUDING THE OPTICAL UNIT

TECHNICAL FIELD

The present invention relates to an optical unit that includes two light sources, and a projection display device.

BACKGROUND ART

There is a projection display device that includes two light sources to acquire light of high luminance. This projection display device enables acquisition of light of high luminance by synthesizing light emitted from the light sources.

FIG. 1 schematically shows an internal mechanism of the projection display device that includes the two light sources. The projection display device includes two light sources 401a and 401b located side by side. Two light sources 401a and 401b are set in the same direction.

In the projection display device, first, lights from light sources 401 and 401b enter color wheel 402. Color wheel 402 is a disk-like member that includes a translucent color filter. The color filter is divided into a plurality of color separation areas in a circumferential direction. Each color separation area selectively allows transmission of only light of a wavelength that becomes red, green or blue. Color wheel 402 can rotate around a central axis. By rotating color filter 402, the color separation areas through which the lights emitted from light sources 401a and 401b are transmitted are continuously changed.

The lights transmitted through color wheel 402 enter one of the ends of rod lenses 404a and 404b. Rod lenses 404a and 404b are rod-shaped glass members rectangular in section. The lights that have entered one of the ends of rod lenses 404a and 404b are transmitted through rod lenses 404a and 404b to exit from the other ends. The lights are totally reflected repeatedly on side faces of rod lenses 404a and 404b during transmission from one of the ends of rod lenses 404a and 404b to the other ends. Thus, luminance distribution is made uniform.

The lights that have exited from rod lenses 404a and 404b are transmitted through condenser lenses 405a and 405b, and then enter condenser lens 406. The lights transmitted through condenser lens 406 are reflected by planar lens 407, and then enter condenser lens 408.

The lights transmitted through condenser lens 408 enter digital micromirror device (DMD) 409. DMD 409 is an image forming element having many mirror elements attached on a semiconductor memory cell to be switched on/off individually based on image signals. The lights that have entered DMD 409 and that have been reflected by the mirror elements of DMD 409 to be modulated are magnified and projected on a screen (not shown) from projection lens 411.

In the projection display device, the lights that have exited from rod lenses 404a and 404b gradually approach each other while they are sequentially transmitted through condenser lenses 406 and 408. The lights overlap each other to become almost one light flux, and enter DMD 409. Thus, in the projection display device, the lights emitted from two light sources 401a and 401b are synthesized through condenser lenses 406 and 408. This enables displaying of one image on the screen.

However, in the projection display device, the lights emitted from light sources 401a and 401b enter positions opposite each other sandwiching the central axis in the color filter of color wheel 402. Color wheel 402 is always required to set the light emitted from light source 401a and the light emitted from light source 401b similar in color. Thus, the color filter of color wheel 402 must include a pair of opposing color separation areas sandwiching the central axis for each color. In other words, the color filter of color wheel 402 must be divided into six color separation areas in the circumferential direction.

In the projection display device, when the lights emitted from light sources 401a and 401b are transmitted through the color separation area of the same color, light of red, green or blue can be acquired. However, when the lights emitted from light sources 401a and 401b are transmitted over a boundary between the two color separation areas, two colors are mixed. Light of a color made by mixing the two colors is not used for displaying an image. Thus, during incidence of the lights that are emitted from light sources 401a and 401b through two color separation areas, the mirror elements of DMD 409 are all turned off.

As described above, in the projection display device, while the number of colors of light necessary for displaying the image is three, namely, red, green, and blue, the color filter must be divided into twice as many as the number of colors, namely, six color separation areas. The number of times of turning off all the mirror elements of DMD 409 per rotation of color wheel 402 is three when there are three color separation areas. However, the number is six in the projection display device. As a result, in the projection display device, the lights emitted from light sources 401a and 401b cannot be efficiently used for displaying the image.

FIG. 2A is a configuration view schematically showing an internal mechanism of a projection display device including two light sources and configured to transmit lights emitted from the light sources through the same color separation area of a color filter. The projection display device shown in FIG. 2A is similar in configuration to the projection display device shown in FIG. 1 except for a configuration described below.

The projection display device includes triangular prism 503 that includes mirror-coated surfaces 503a and 503b. In the projection display device, lights emitted from light sources 501a and 501b are reflected by surfaces 503a and 503b of triangular prism 503, transmitted through positions of a color filter of color wheel 502 approaching each other, and then enter one end of rod lens 504. In the projection display device, therefore, the lights emitted from light sources 501a and 501b can be transmitted through the same color separation area of the color filter. Thus, the color filter is only required to be divided into three color separation areas equal to the number of colors of light necessary for displaying an image.

CITATION LIST

Patent Literature

Patent Literature 1: JP2001-13604A

Problems to be Solved

However, in the projection display device shown in FIG. 2A, as shown in FIG. 2B, the lights emitted from light sources 501a and 501b enter the color filter of color wheel 502 as different light fluxes 511a and 511b. This requires each color separation area of the color filter to be large enough to transmit the lights emitted from light sources 501a and 501b. Thus, in the projection display device, the color filter must be formed larger than that in the case of one light source.

As shown in FIG. 2C, the relative positions of light sources 501a and 501b and triangular prism 503 can be changed so that light fluxes 512a and 512b from light sources 501a and 501b enter color wheel 502 as one light flux. This eliminates the necessity of forming a large color filter.

In this case, however, one half of the lights emitted from light sources 501a and 501b on color wheel 502 side does not enter surfaces 503a and 503b of triangular prism 503. Hence, it is not projected from projection lens 511 shown in FIG. 2A. In other words, only one half of the lights emitted from light sources 501a and 502b is projected from projection lens 511. In this case, therefore, only light whose luminance is equal to that in the case of one light source can be acquired.

As shown in FIG. 2D, the shape of the prism can be changed so that two light fluxes 513a and 513b from light sources 501a and 501b can intersect each other at color wheel 502. The lights emitted from light sources 501a and 501b are accordingly transmitted through the same position of the color filter of color wheel 502. This eliminates the necessity of forming a large color filter.

In this case, however, light expansion becomes large when the lights emitted from light sources 501a and 501b enter rod lens 504 after transmission through color wheel 502. Lights exiting from rod lens 504 are similarly diffused greatly, and hence the area of light flux transmitted after rod lens 504 becomes thick. As a result, to transmit sufficient light, members such as condenser lenses 505 and 506 must be formed large.

It is therefore an object of the present invention to provide an optical unit that includes two light sources, and a projection display device.

SUMMARY OF INVENTION

To achieve the object of the present invention, an optical unit includes: a first light source; a second light source located to face the first light source; a color wheel located between the first light source and the second light source; a first optical path conversion unit that totally reflects light emitted from the first light source and transmitted through the color wheel, and transmits light emitted from the second light source to enter color wheel; and a second optical path conversion unit that totally reflects the light emitted from the second light source and transmitted through the color wheel, and transmits the light emitted from the first light source to enter the color wheel.

Effect of Invention

According to the present invention, the compact optical unit that includes the two light sources, and a projection display device can be provided.

BRIEF DESCRIPTION OF DRAWINGS

FIG. 2B is a partially enlarged view schematically showing the internal mechanism of the projection display device shown in FIG. 2A.

DESCRIPTION OF EMBODIMENTS

Next, the preferred embodiments of the present invention are described with reference to the accompanying drawings.

First Embodiment

Figure 1:
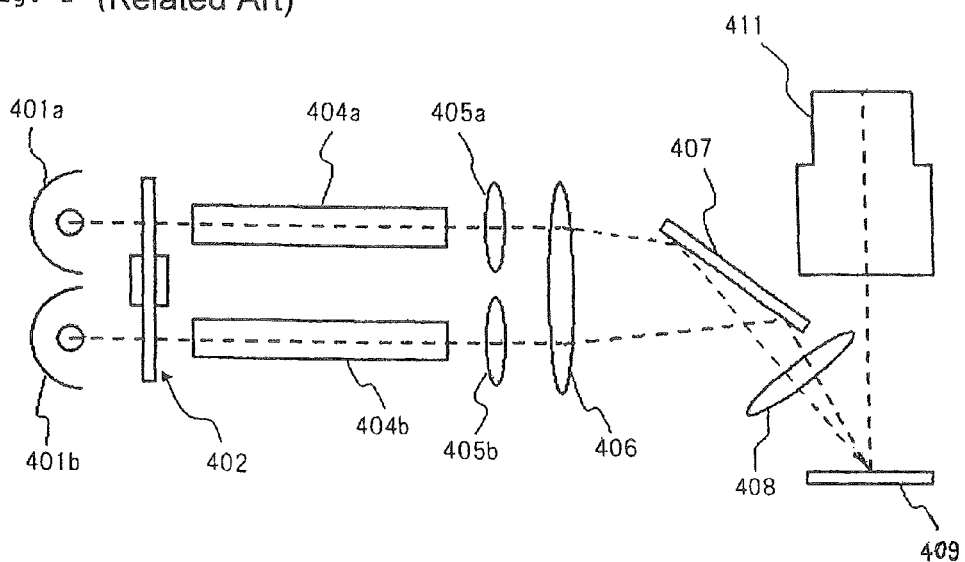
FIG. 1 is a configuration view schematically showing an internal mechanism of a projection display device according to the present invention.
Figure 2A:
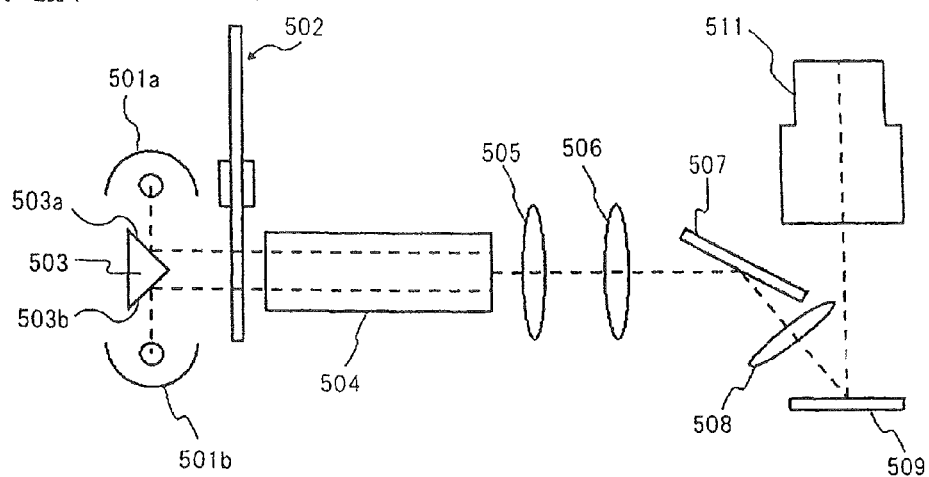
FIG. 2A is a configuration view schematically showing an internal mechanism of a projection display device according to the present invention.
Figure 2C:
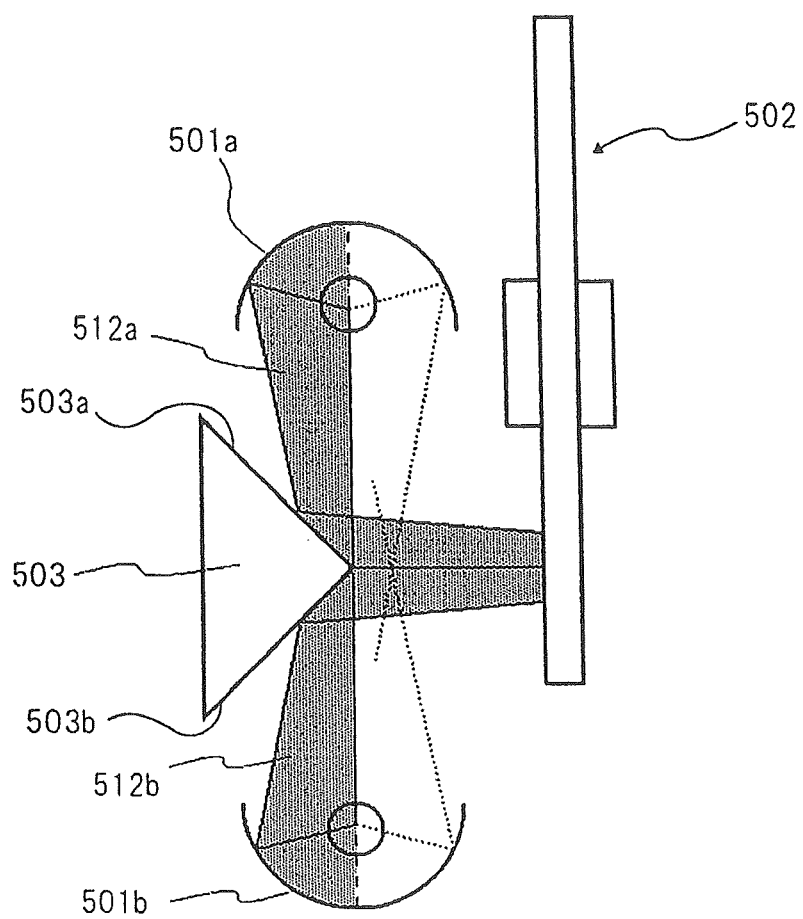
FIG. 2C is a partially enlarged view schematically showing the internal mechanism of the projection display device shown in FIG. 2A.
Figure 2D:
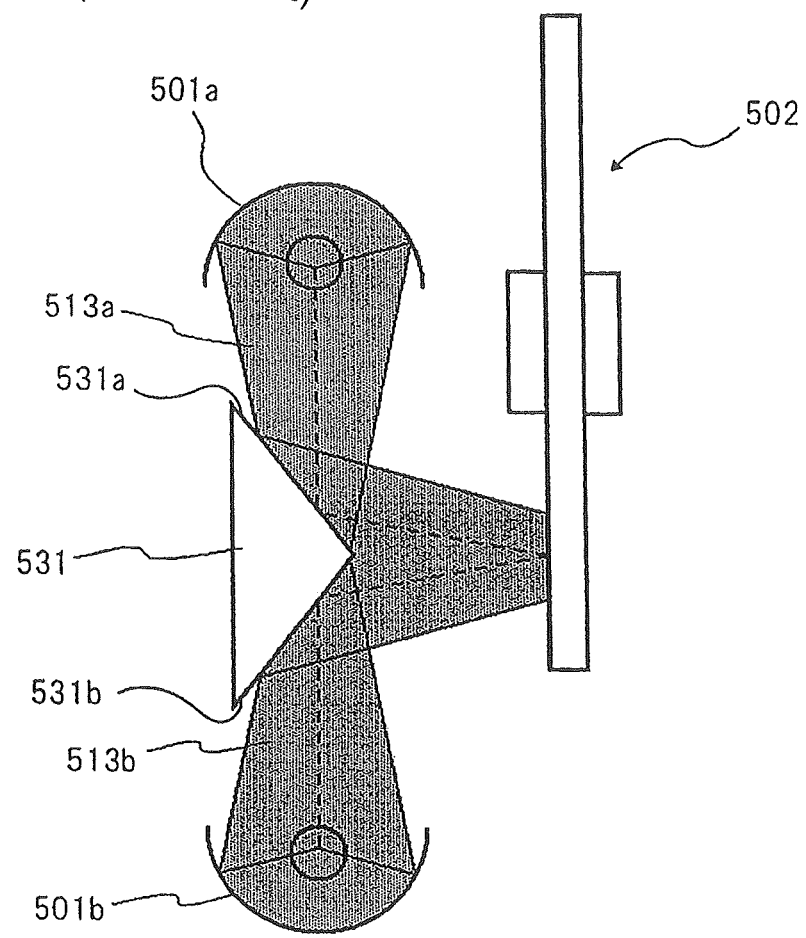
FIG. 2D is a partially enlarged view schematically showing the internal mechanism of the projection display device shown in FIG. 2A.
Figure 3A:
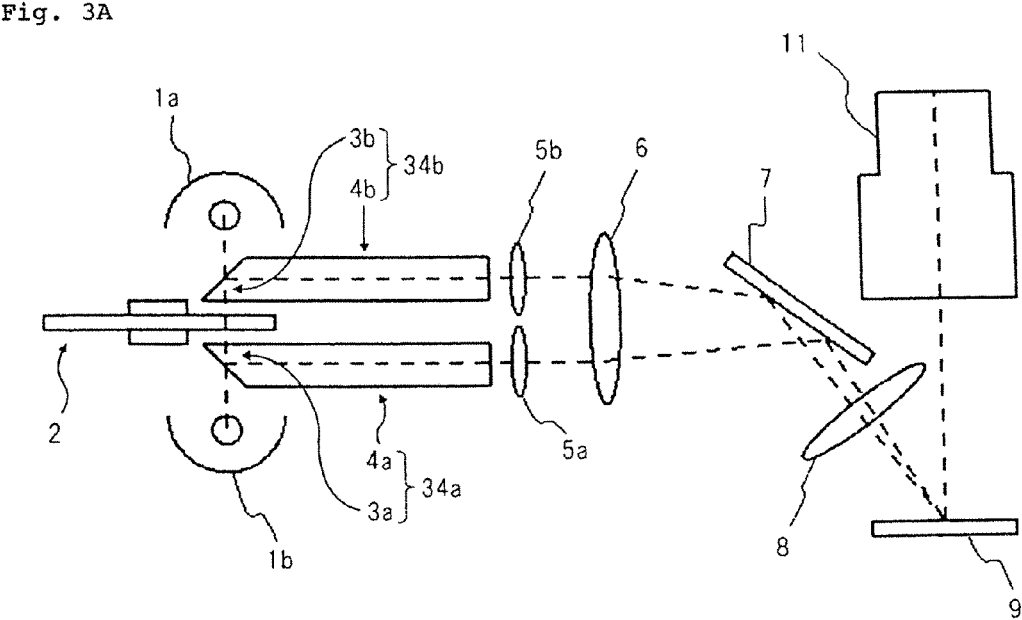
FIG. 3A is a configuration view schematically showing an internal mechanism of a projection display device according to a first embodiment of the present invention.
Figure 3B:
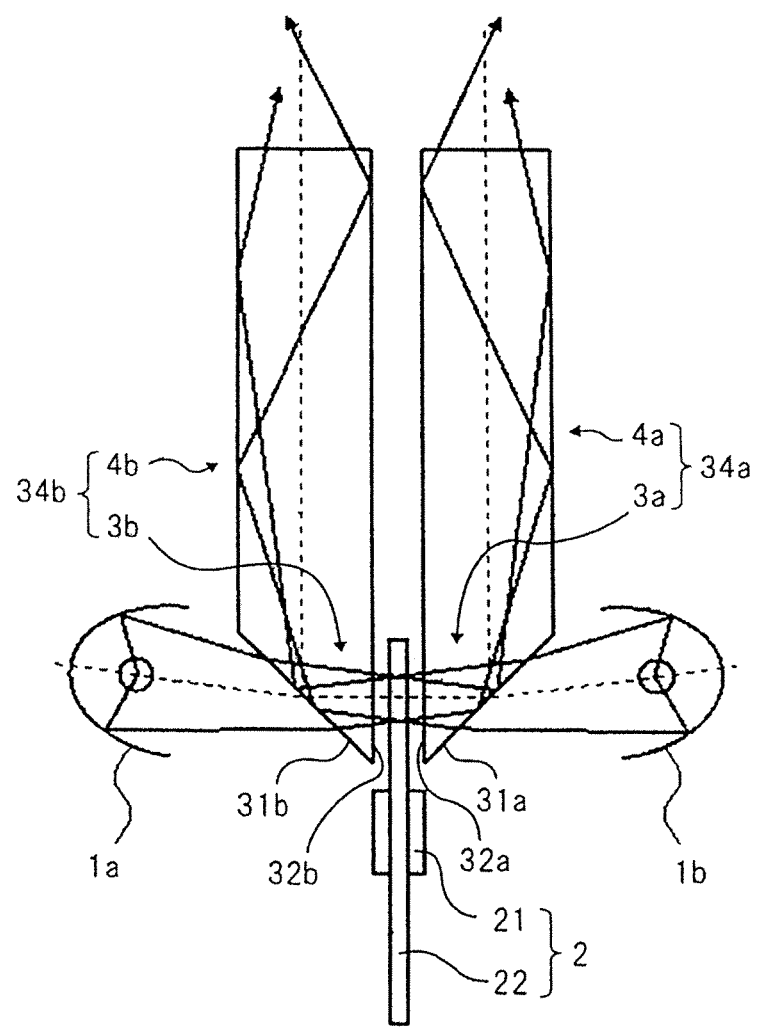
FIG. 3B is a partially enlarged view schematically showing the internal mechanism of the projection display device shown in FIG. 3A.

FIG. 3A is a configuration view schematically showing an internal mechanism of a projection display device according to a first embodiment of the present invention. FIG. 3B is an enlarged view showing light sources, a color wheel, and light guide rods shown in FIG. 3A.

The projection display device according to the embodiment includes two light sources 1a and 1b located to face each other. For light sources 1a and 1b, extra-high-pressure mercury lamps are used. For the lights sources, others such as metal halide lamps, halogen lamps, or xenon lamps can be used. Color wheel 2 is disposed between light sources 1a and 1b. Color wheel 2 includes translucent color filter 22, and motor 21 for rotating color wheel 2 around a central axis.

The projection display device includes two rod-shaped light guide rods 34a and 34b. Light guide rods 34a and 34b are made of glass such as BK7 where a transmittance of light (wavelength 400 nanometers to 700 nanometers) of a visible area is at least 99.4%. Light guide rods 34a and 34b are arranged in parallel.

Prism unit 3a is disposed at one end of light guide rod 34a. Prism unit 3a is located between light source 1b and color wheel 2. A surface of prism unit 3a on light source 1b side is slope 31a obliquely inclined in a longitudinal direction of light guide rod 34a. Light guide rod 34a includes rod lens unit 4a that extends from prism unit 3a to the other end of light guide rod 34a. Rod lens unit 4a is rectangular in section.

Prism unit 3b is disposed at one end of light guide rod 34b. Prism unit 3b is located between light source 1a and color wheel 2. A surface of prism unit 3b on light source 1a side is slope 31b obliquely inclined in a longitudinal direction of light guide rod 34b. Light guide rod 34b includes rod lens unit 4b that extends from prism unit 3b to the other end of light guide rod 34b. Rod lens unit 4b is rectangular in the cross section.

In the projection display device, the light emitted from light source 1a first enters slope 31b of prism unit 3b, and is then transmitted through prim unit 3b to exit from surface 32b. The light that has exited from surface 32b of prism unit 3b enters color filter 22 of color wheel 2.

The light emitted from light source 1a and transmitted through color filter 22 enters surface 32a of prism unit 3a, and is then transmitted through prism unit 3a to enter slope 31a from the inside of prism unit 3a. Prism unit 3a is formed so that an incident angle of the light emitted from light source 1a, when it enters slope 31a, can be larger than a critical angle.

The light that has entered prism unit 3a is accordingly reflected totally by slope 31a without exiting from slope 31a, and enters one end of rod lens unit 4a of light guide rod 34a. Thus, prism unit 3a functions as a first optical path conversion unit that changes the traveling direction of the light emitted from light source 1a, and guides the light emitted from light source 1a to one end of rod lens 4a.

The light that has entered rod lens unit 4a is transmitted through rod lens unit 4a to exit from the other end. This light is repeatedly reflected, during its transmission from one end of rod lens 4a to the other end, totally by the side face of rod lens 4a so that the light is caused to have an uniform luminance distribution.

The light emitted from light source 1b first enters slope 31a of prism unit 3a, and is then transmitted through prism unit 3a to exit from surface 32a. The light that has exited from surface 32a of prism unit 3a is transmitted through the same position as that of color filter 22 of color wheel 2 through which the light emitted from light source 1a is transmitted from a side opposite the light emitted from light source 1a.

Thus, in the projection display device according to the embodiment, the lights emitted from light sources 1a and 1b are transmitted through the same position from both sides of color filter 22, and hence there is no need to enlarge the color separation area of color filter 22. Therefore, while the projection display device includes the two light sources, a size of color filter 22 can be equal to the size of one light source in the case in which there is only one light source.

The light emitted from light source 1b and transmitted through color filter 22 enters surface 32b of prism unit 3b, and is then transmitted through prism unit 3b to enter slope 31b from the inside of prism unit 3b. Prism unit 3b is formed so that an incident angle of the light emitted from light source 1b when it enters slope 31b can be larger than a critical angle.

The light that has entered prism unit 3b is accordingly reflected totally by slope 31b without exiting from slope 31b, and enters one end of rod lens unit 4b of light guide rod 34b. Thus, prism unit 3b functions as a second optical path conversion unit that changes the traveling direction of the light emitted from light source 1b, and guides the light emitted from light source 1b to one end of rod lens 4b.

The light that has entered rod lens unit 4b is transmitted through rod lens unit 4b to exit from the other end. This light is repeatedly reflected, during its transmission from one end of rod lens 4b to the other end, totally by the side face of rod lens 4b so that the lights is caused to have an uniform luminance distribution.

In the projection display device according to the embodiment, prism units 3a and 3b and rod lens units 4a and 4b are integrally formed, and hence the number of components is smaller than when these components are separately provided. This reduces manufacturing costs.

The lights from rod lens units 4a and 4b are transmitted through condenser lenses 5a and 5b, and then enter condenser lens 6. The lights transmitted through condenser lens 6 are reflected by planar mirror 7, and then transmitted through condenser lens 8 to enter DMD 9. Thus, condenser lenses 5a, 5b, 6, and 8, and planar mirror 7 constitute a relay optical system for guiding the lights to DMD 9.

The lights transmitted through condenser lenses 5a and 5b gradually approach each other while sequentially being transmitted through condenser lenses 6 and 8. The lights overlap each other to enter DMD 9 as almost one light flux. In other words, condenser lenses 6 and 8 function as relay optical systems, and as synthesis mechanisms of synthesizing the lights emitted from light sources 1a and 1b. This makes the lights entering DMD 9 twice as bright as the light in the case of one light source.

As described above, in the projection display device according to the embodiment, the optical unit is configured to separate the lights emitted from two light sources 1a and 1b by color, make the light uniform, and synthesize the lights. The inclusion of the optical unit in the projection display device enables color-separated, uniform and bright lights to enter DMD 9 that is an illumination target.

The lights that have exited from the optical unit to enter DMD 9 are reflected by mirror elements included in DMD 9 to be modulated. The lights modulated by DMD 9 are magnified to be projected on a screen (not shown) from projection lens 11. DMD 9 can be changed to another image forming element, and projection lens 11 can be changed to another projection optical system.

Figure 4:
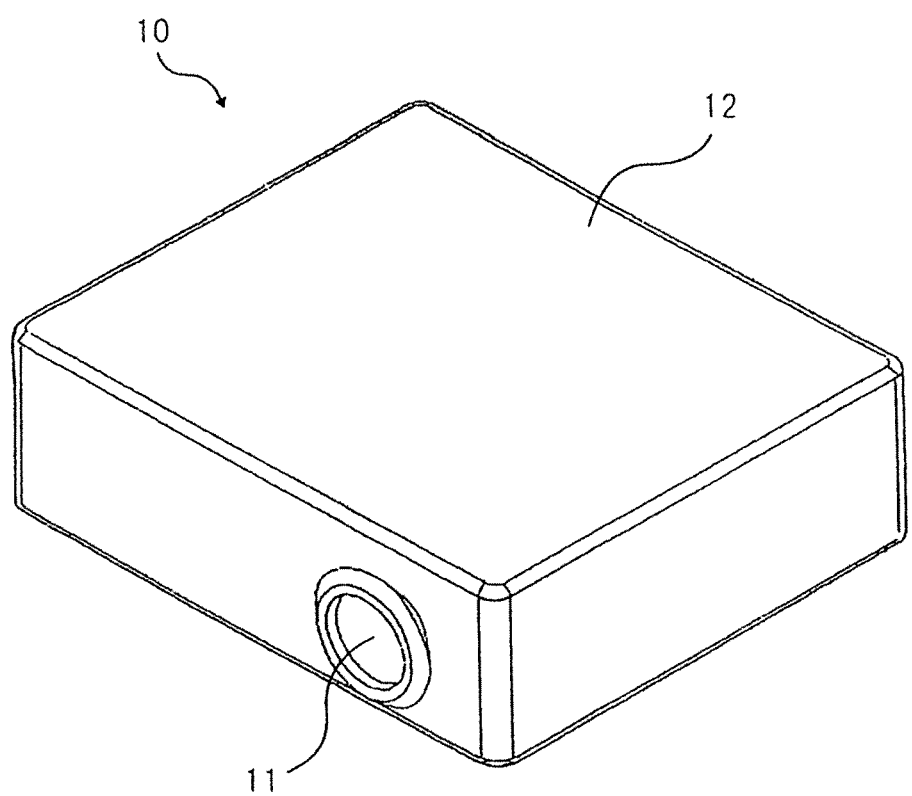
FIG. 4 is a perspective view showing the projection display device that includes the internal mechanism shown in FIG. 3A.

FIG. 4 is a perspective view showing the projection display device that includes the internal mechanism shown in FIG. 3A. In projection display device 10, the internal mechanism shown in FIG. 3A is covered with case 12, and projection lens 11 is exposed to a side face of case 12. In this projection display device, the internal mechanism is operated as described above to project lights from projection lens 11, thereby displaying an image on the screen. In the projection display device, the optical unit enables bright lights to enter DMD 9. Thus, a bright and clear image can be displayed on the screen.

Second Embodiment

Figure 5:
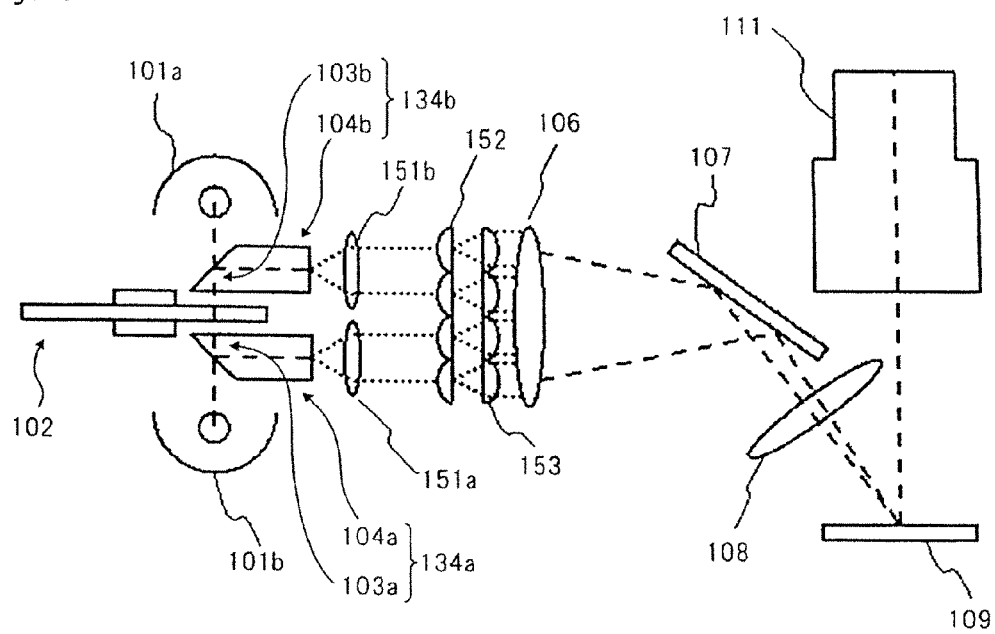
FIG. 5 is a configuration view schematically showing an internal mechanism of a projection display device according to a second embodiment of the present invention.

FIG. 5 is a configuration view schematically showing an internal mechanism of a projection display device according to a second embodiment of the present invention. The projection display device according to the embodiment is similar in configuration to the projection display device of the first embodiment except for the configuration described below.

The projection display device according to the embodiment includes collimator lenses 151a and 151b, first fly-eye lens 152, and second fly-eye lens 153. Collimator lenses 151a and 151b convert diffused lights into parallel lights. Fly-eye lenses 152 and 153 are configured by arranging a plurality of single lenses in a matrix, one surface of each being convex and the other surface being planar. Planar sides of fly-eye lenses 152 and 153 face each other.

In the projection display device, lights emitted from light sources 101a and 101b are transmitted through color wheel 102, and are totally reflected by prism units 103a and 103b to enter rod lens units 104a and 104b. The lights transmitted through rod lenses 104a and 104b are transmitted through collimator lenses 151a and 151b to be converted from diffused lights into parallel lights. The parallel lights transmitted through collimator lenses 151a and 151b enter first fly-eye lens 152 from the convex surface side. The lights transmitted through first fly-eye lens 152 enter second fly-eye lens 153 from the planar surface side. The lights are overlapped during transmission through fly-eye lenses 152 and 153 so that the lights are caused to have an uniform luminance distribution.

The lights transmitted through fly-eye lenses 152 and 153 and made to have an uniform luminance distribution are transmitted through fled lens 106, reflected by planar mirror 107, and are then transmitted through condenser lens 108. The lights transmitted through condenser lens 108 are modulated by DMD 109, and then magnified to be projected on a screen from projection lens 111.

In the projection display device according to the embodiment, collimator lenses 151a and 151b, first fly-eye lens 152, and second fly-eye lens 153 function as an integrator optical system so that the light is caused to have an uniform luminance distribution. Thus, rod lens units 104a and 104b are not required to have any mechanism for making the light luminance distribution uniform. As a result, according to the embodiment, rod lens units 104a and 104b of light guide rods 134a and 134b can be formed short.

As described above, in the projection display device, while there are collimator lenses 151a and 151b, first fly-eye lens 152, and second fly-eye lens 153, rod lens units 104a and 104 of light guide rods 134a and 134b can be formed short. Thus, the optical unit can be miniaturized.

Third Embodiment

Figure 6:
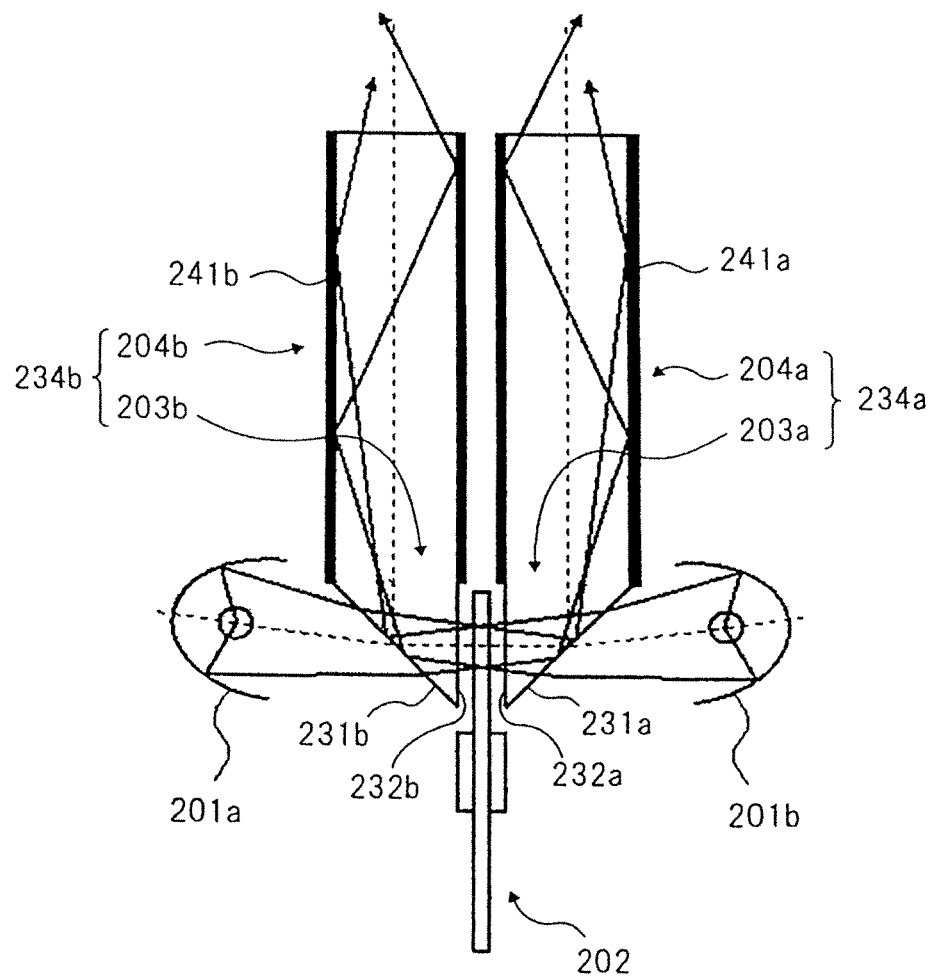
FIG. 6 is a configuration view schematically showing an internal mechanism of a projection display device according to a third embodiment of the present invention.

FIG. 6 is a configuration view schematically showing an internal mechanism of a projection display device according to a third embodiment of the present invention. The projection display device according to the embodiment is similar in configuration to the projection display device of the first embodiment except for a configuration described below.

In the projection display device according to the embodiment, mirror coats 241a and 241b are applied on side faces of rod lens units 204a and 204b of light guide rods 234a and 234b.

In the projection display device, lights emitted from light sources 201a and 201b are transmitted through color wheel 202, and then totally reflected by prism units 203a and 203b to enter one of the ends of rod lens units 204a and 204b. The lights that have entered rod lens units 204a and 204b are transmitted through rod lens units 204a and 204b to exit from the other ends. Rod lens units 204a and 204b repeatedly reflect, during transmission of the lights from one of the ends to the other end, the lights by the side faces having mirror coats 241a and 241b so as to cause the light to have an uniform luminance distributions.

In the case in which no mirror coat is applied on the side faces of the rod lens units, when the side faces of the rod lens units are stained, the lights transmitted through rod lens units are discharged out of the rod lens units without being totally reflected by the side faces of the rod lens units. Thus, management is extremely important to maintain the light guide rods in an unstained state.

However, in the projection display device according to the embodiment, mirror coats 241a and 241b are applied to the side faces of rod lens units 204a and 204b. This prevents the lights from being discharged out of the side faces of rod lens units 204a and 204b even when the side faces are stained. Thus, management of light guide rods 234a and 234b is easy. In the projection display device, light loss during transmission through rod lens units 204a and 204b can be reduced. As a result, a bright image can be displayed.

Fourth Embodiment

Figure 7A:
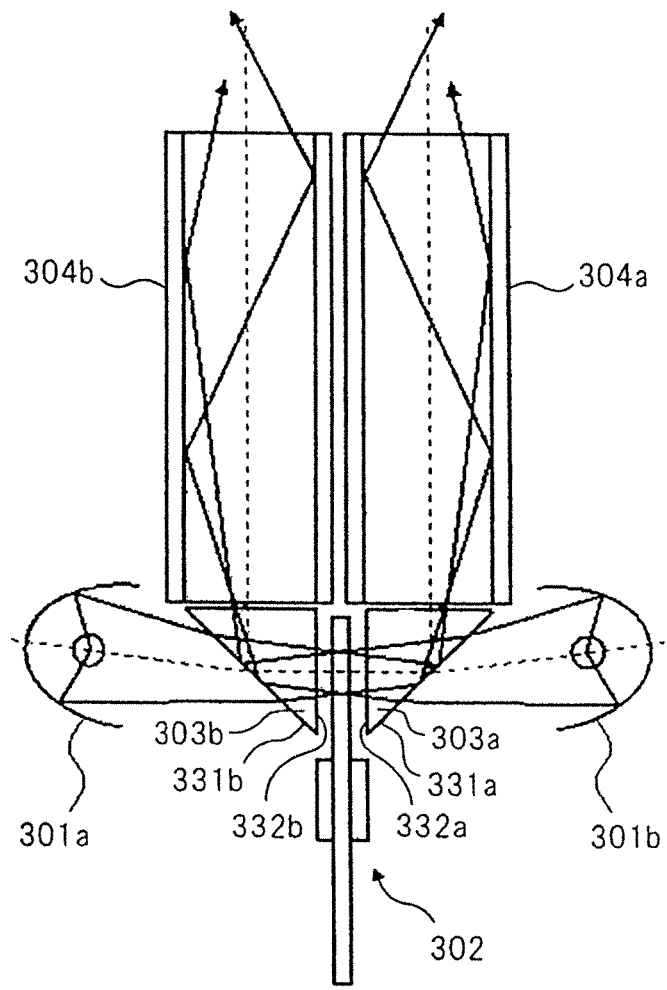
FIG. 7A is a configuration view schematically showing an internal mechanism of a projection display device according to a fourth embodiment of the present invention.

FIG. 7A is a configuration view schematically showing an internal mechanism of a projection display device according to a fourth embodiment of the present invention. The projection display device according to the embodiment is similar in configuration to the projection display device of the first embodiment except for the configuration described below.

The projection display device according to the embodiment includes, in place of light guide rods 304a and 304b of the first embodiment shown in FIG. 3B, prisms 303a and 3303b corresponding to prism units 3a and 3b, and light tunnels 304a and 304b corresponding to rod lens units 4a and 4b.

Prisms 303a and 303b are glass members where slopes 331a and 331b are formed. Light tunnels 304a and 304b are cylindrical members formed by combining four rectangular planar mirrors with mirror surfaces set inside.

In the projection display device, lights emitted from light sources 301a and 301b are transmitted through color wheel 302, and then are totally reflected by slopes 331a and 331b of prisms 303a and 303b to enter one of the ends of light tunnels 304a and 304b. The lights that have entered light tunnels 304a and 304b are transmitted through light tunnels 304a and 304b to exit from the other ends. During transmission of the lights from one of the ends to the other end, the lights are repeatedly reflected by the mirror surfaces of light tunnels 304a and 304b so as to cause the lights to have an uniform luminance distribution.

Air has higher light transmittance properties than glass and hence light tunnels 304a and 304b, whose inside are hollow, enable more efficient transmittance of light than the rod lenses. In the projection display device according to the embodiment, therefore, light loss when the light luminance distributions are made uniform can be reduced. As a result, the projection display device can display a bright image.

Figure 7B:
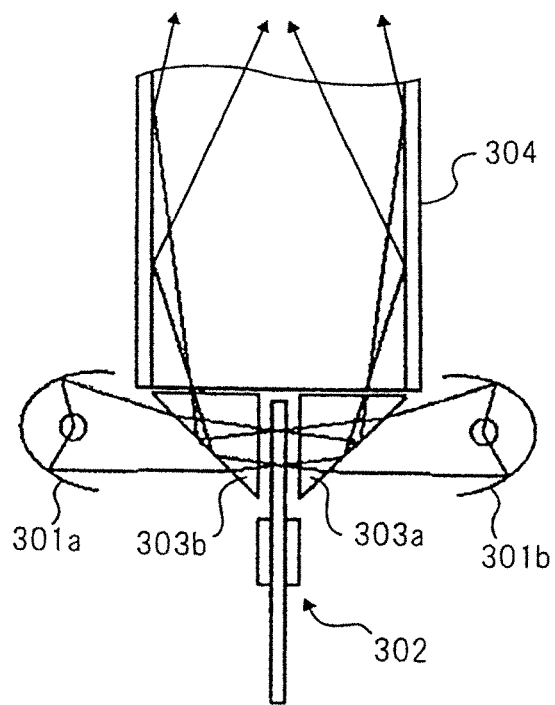
FIG. 7B is a configuration view schematically showing a modified example of the internal mechanism of the projection display device shown in FIG. 7A.

The projection display device according to the embodiment includes, for the respective lights, two light tunnels 304a and 304b so as to make uniform the luminance distributions of the lights totally reflected by slopes 331a and 331b of prisms 303a and 303b. However, as shown in FIG. 7B, the number of light tunnels can be one.

In this case, the lights totally reflected by slopes 331a and 331b of prisms 303a and 303b enter one end of light tunnel 304. Lights that have entered the end of light tunnel 304 are made to have an uniform luminance distribution during transmission through light tunnel 304, and exit from the other end as one light flux. Thus, light tunnel 304 functions to make the light luminance distributions uniform and to synthesize the lights emitted from light sources 301a and 301b.

The preferred embodiments of the present invention have been described. However, the present invention is not limited to the embodiments. Various changes understandable to those skilled in the art can be made to be the configuration and details without departing from the spirit and the scope of the invention.

EXPLANATION OF REFERENCE NUMERALS 1a, 1b light source
2 color wheel
3a, 3b prism unit
4a, 4b rod lens unit
5a, 5b, 6, 8 condenser lens
7 planar mirror
9 DMD
10 projection display device
11 projection lens
34a, 34b light guide rod

The invention claimed is:

1. An optical unit comprising:
a first light source;
a second light source located to face the first light source;
a color wheel located between the first light source and the second light source;
a first optical path conversion unit that totally reflects light emitted from the first light source and transmitted through the color wheel, and that transmits light emitted from the second light source to enter the color wheel;
a second optical path conversion unit that totally reflects the light emitted from the second light source and transmitted through the color wheel, and that transmits the light emitted from the first light source to enter the color wheel; and
an integrator optical system that makes uniform luminance distributions of the light totally reflected by the first optical path conversion unit and the light totally reflected by the second optical path conversion unit,
wherein the integrator optical system includes a first integrator optical system into which the light that is totally reflected by the first optical path conversion unit enters, and a second integrator optical system into which the light that is totally reflected by the second optical path conversion unit enters, and
wherein the first optical path conversion unit and the first integrator optical system are integrally formed, and the second optical path conversion unit and the second integrator optical system are integrally formed.

2. The optical unit according to claim 1, wherein each of the integrator optical systems includes a rod lens.

3. The optical unit according to claim 1, wherein each of the integrator optical systems includes a fly-eye lens.

4. A projection display device comprising:
the optical unit specified in claim 1;
an image forming element that modulates light applied from the optical unit based on an image signal; and
a projection optical system that projects the light modulated by the image forming element.

5. The optical unit according to claim 2, wherein a side face of the rod lens is mirror-coated.

6. The projection display device according to claim 4, wherein the image forming element comprises a DMD.

* * * * *